United States Patent [19]
Donaldson

[11] Patent Number: 5,853,473
[45] Date of Patent: Dec. 29, 1998

[54] PATCHING COMPOSITION FOR CONCRETE SURFACES

[76] Inventor: Harold Donaldson, 113 S. Lucia, Apt. No. 2, Redondo Beach, Calif. 90277

[21] Appl. No.: 871,728

[22] Filed: Jun. 9, 1997

Related U.S. Application Data

[63] Continuation-in-part of Ser. No. 391,723, Feb. 21, 1995, abandoned, which is a continuation-in-part of Ser. No. 157,311, Nov. 26, 1993, abandoned.

[51] Int. Cl.[6] ............................................. C04B 7/06
[52] U.S. Cl. ..................... 106/695; 106/703; 106/704; 106/737; 106/792
[58] Field of Search ..................... 106/695, 703, 106/704, 721, 737, 792

[56] References Cited

U.S. PATENT DOCUMENTS 3,135,617  6/1964  Newell et al. .
5,244,304  9/1993  Weill et al. ................................. 404/67
5,362,320  11/1994  Whatcott .................................. 106/709

*Primary Examiner*—Paul Marcantoni
*Attorney, Agent, or Firm*—Robert J. Schaap

[57] ABSTRACT

A patching composition in the form of a putty composition for application to concrete surfaces. The composition comprises a substantial portion of a conventional cement, such as a Portland cement, and a silica sand selected to have the right consistency and density along with calcium oxide. The composition is then mixed in water and applied to voids or holes in a concrete wall. The composition, when applied as a single coating and fully cured, results in an appearance similar to that of the concrete and provides strength characteristics substantially equivalent to that of the original concrete.

19 Claims, No Drawings

PATCHING COMPOSITION FOR CONCRETE SURFACES

RELATED APPLICATION

This application is a continuation-in-part of my U.S. patent application Ser. No. 08/391,723, filed Feb. 21, 1995, for Patching Composition and Method for Concrete Surfaces, and which is, in turn, a continuation-in-part of my U.S. patent application Ser. No. 08/157,311, filed Nov. 26, 1993, for Patching Composition and Method for Concrete Surfaces both abandoned.

BACKGROUND OF THE INVENTION

1. Field of the Invention

This invention relates in general to certain new and useful improvements in patching compositions for concrete surfaces, and more particularly, to a new and improved patching composition in the form of a putty which has a surface appearance and texture similar to that of the actual concrete but of significantly lesser weight than an equivalent amount of concrete.

2. Brief Description of the Prior Art

In recent years, there have been many so-called "putties" or compositions for patching a variety of surfaces, as for example, wood putty and the like. Compositions are offered for patching plaster and plaster board walls and the like. In many cases, these compositions rely upon a plastic resin as a base.

Heretofore, there has not been any commercially available and highly effective patching composition in the form of a putty for application to concrete surfaces to fill in voids or holes in the concrete surfaces. Generally, when a void or hole exists in a concrete surface, one attempting to repair the same usually obtains additional cement and mixes the cement with sand and other necessary ingredients, in order to obtain a concrete slurry. The concrete slurry is then applied to the holes and voids in the surface.

Using the presently available concrete compositions for patching is particularly difficult and requires a great deal of skill. Moreover, the concrete slurry by its very nature is quite heavy and difficult to use. Often times, in the case of building structures where many of the walls are made of stucco, (a form of concrete) there is no effective stucco patching compositions. The putty compositions of the present invention are highly effective for patching of stucco concrete surfaces.

It is important when applying a patching composition to a wall, such as a wall of a dwelling structure that the resultant putty, when hardened, has a surface appearance and texture similar to that of the concrete surfaces to which the composition is applied. Otherwise, the putty composition appears to be exactly that which it is, namely, a patching composition.

The present invention obviates these and other problems in the provision of a new patching composition for concrete surfaces which is relatively light in weight, compared to other conventional concrete compositions and which is easily usable and can match the surface characteristics and appearances of an existing concrete surface.

OBJECTS OF THE INVENTION

It is, therefore, one of the primary objects of the present invention to provide a patching composition for concrete surfaces which when applied to a void or hole in concrete, results in a surface appearance and texture similar to that of the original concrete wall and, in effect, blends into that wall.

It is another object of the present invention to provide a patching composition of the type stated which is made of a cementitious material but which is also of significantly less weight than that of a conventional concrete composition.

It is a further object of the present invention to provide a process of applying a putty composition to holes and voids in a concrete surface utilizing the aforesaid patching compositions.

It is still an additional object of the present invention to provide a composition of the type stated which relies upon the addition of calcium oxide to provide a desired degree of hardness and strength, as well as a potential pigment mixed with the composition in order to provide a desired color.

With the above and other objects in view, my invention resides in the novel features of form, construction, arrangement and combination of the components forming part of the composition and in the steps in the process utilizing same as presently described and pointed out in the claims.

BRIEF SUMMARY OF THE INVENTION

A patching composition for application to concrete surfaces for purposes of filling the holes and voids in the concrete surface. The composition is made so that it is fairly viscous and can be applied to a concrete surface with a float or a trowel. The composition has a long life and is easy to employ. Moreover, it can be mixed with a desired pigment to add a desired color for purposes of matching an existing concrete surface.

The patching composition is of significantly less weight than a like amount of a conventional concrete composition. Furthermore, the composition is adapted so that it can match the surface appearance of the original concrete surface. While the composition of the present invention can be used with essentially any concrete composition surface, it is primarily adapted for, and especially useful, in connection with concrete rendering rough and course surfaces such as so-called "honeycomb" concrete or so-called "rock pocket" concrete. This type of concrete is mixed with a large quantity of rocks, such as, for example, one to three inch rocks, and when cured, leaves small surface holes, such as so-called "pin holes" and voids. These voids may also result from cracks occurring during curing of the concrete. The surface is therefore quite rough, much in the nature of a stucco-type cement.

The patching composition of the present invention is not only effective in filling these small pin holes and voids, but the composition can be spread over the entire surface of the concrete and provides a relatively smooth surface, much in the same manner as a plaster.

The composition comprises a cementitious material, such as Portland cement, in an amount of about 25% to about 65% by weight, based on the total weight of the composition. The composition also comprises a silica sand having a particle size which is selected to conform generally to the size of the void or the hole to which the composition is applied. Thus, for a larger hole or void, a heavier silica sand such as a No. 60 sand is employed. For smaller holes and voids, a smaller particle size sand such as a No. 30 sand is employed.

When the silica sand employed is a No. 60 sand, it is normally present in an amount of about 25% to about 65% by weight, based on the total weight of the composition. When the silica sand is a No. 30 silica sand, it is generally present in an amount of about 15% to about 32% by weight based on the total weight of the composition. Generally, the silica sand will be present in an overall amount of about 15% to about 65% based on the total weight of the composition.

The composition also comprises a calcium oxide present in an amount of about 4% by weight to about 30% by weight based on the total weight of the composition.

The composition also comprises of water in an amount of about 9% to about 30% by weight based on the total weight of the composition. Further, and as indicated above, a pigment can be added to the composition in an amount of about 0.2% to about 1% by weight based on the total weight of the composition. Optionally, chopped fibers or other forms of fiber reinforcing material can be added to the composition and is mixed thoroughly throughout the composition.

It is also possible to employ a mixture of sands of different particle size, as, for example, one portion of a No. 30 particle size sand, and another portion of a No. 60 particle size sand. Again, the amount of the No. 60 sand compared to the No. 30 sand, would increase as the coating thickness increases. This combination of different particle size sands has been found to be effective in that it allows for the efficient filling of cracks and voids in the concrete to which the composition is applied, and, in addition, the smaller particle size allows for a relatively smooth finish.

When two different sizes of sand are employed, the amount of concrete could vary between about 25% to about 45%. The amount of the larger particle size sand, such as the No. 30 sand, would also be present in an amount of about 12% to about 25% by weight of the composition. The smaller particle size sand, such as the No. 60 sand, would be present in an amount of about 25% to about 45%. Finally, the calcium oxide would be present in an amount of about 4% to about 15%.

In one important aspect of the invention, the patching composition is applied as a single coat. Moreover, the thickness of that coat can range from about a minimum thickness of about ⅛ inch to a maximum thickness of about ¼ inch. Depending upon the particular application, it is possible to use coating thicknesses of greater amounts if necessary.

The present invention also provides a method of patching holes and voids in concrete surfaces by using a composition which is not a conventional concrete composition and which will also match the surface appearance of the original concrete surface. This method generally relies upon the application of the composition previously described.

The composition of the present invention is capable of being applied in a single coat, as aforesaid, and typically is only applied in a single coat. Thus, substantial labor costs in use of the composition is greatly reduced when compared to conventional Portland cement compositions which require three coats, such as a brown coat, a scratch coat and a finish coat. Moreover, the total drying time of a conventional Portland cement composition is at least three days, whereas the present composition has a cured structure integrity in 15 to 25 minutes and a full cure in 8 to 12 hours or less. While a full cure may take as much as 12 hours, that is still substantially less than the typical three day drying time of a conventional Portland cement composition.

This invention possesses many other advantages and has other purposes which may be made more clearly apparent from a consideration of the forms in which it may be embodied. These forms are described in the following detailed description. However, it is to be understood that the detailed description is set forth for purposes of disclosing the general principles of the invention, but it is to be understood that such detailed description is not to be taken in a limiting sense.

DETAILED DESCRIPTION OF PREFERRED EMBODIMENTS

Referring now in more detail to the specific embodiments of the patching composition, the silica sand which is selected and the cementitious material, in the nature of Portland cement, are usually mixed in desired amounts to form a concrete base. The sand and the cement are generally mixed with water in a conventional arrangement in order to form this base. Generally, a conventional silica sand of the type used in the overall formation of concrete structures is used in accordance with the present invention.

Any conventional cement may be used although the type II industrial grade Portland cement is preferred. However, cements which are employed are preferably comprised of a silicone dioxide and aluminum oxide-ferris oxide combination and they may include some magnesium oxide. To some extent, the cement itself may also include calcium oxide. However, the amount of calcium oxide which is normally present in the cement is substantially less than that desired for use in the composition of the present invention.

The silica sands which are preferably used in accordance with the present invention range from about a maximum of about a No. 80 sand, that is an 80 grit, to about a number 10 sand, that is, a number 10 grit. The desired grit size may vary depending upon the surface texture which is desired in the final product.

While the cement itself may include some calcium oxide, as mentioned above, it has been found that the addition of a calcium oxide in much larger amounts can provide a desired and controlled degree of hardness of the final product and further, the amount of calcium oxide can control the curing or setting-up process and assist in the bonding itself. Thus, the compositions of the present invention will generally include an amount of calcium oxide substantially greater than that normally found in conventional cements.

The calcium oxide which is used in accordance with the present invention is preferably, although not necessarily the high calcium quick-lime which contains not less than about 90% of calcium oxide and at least up to 5% of magnesium. Small percentages of calcium carbonate, silica, alumina and ferris oxides may also be present.

In many cases, the concrete surface to which the patching composition is applied is normally of a gray color. Inasmuch as the composition itself adopts the normal gray color of conventional concrete and for that matter, conventional stucco, there is often times little need to add any substantial amount of a pigment or for that matter, any pigment at all. However, in some case, the addition of a pigment may be desired in order to assure complete matching of the colors of the patching composition to that of the existing concrete surface.

Any of a number of conventional pigments may be used in the present invention. Those pigments which are used in the composition of this invention are also used or useful in generally conventional cementitious compositions. Naturally, the color of the pigment will vary depending upon the desired color of the end product. Typically, black pigments, gray pigments, blue pigments and darker colored pigments are employed, although any type of pigment may be used in accordance with this invention.

It is important to insure that the pigment is added to the mixture of components while they are in the stage of a slurry, that is, the sand and cement have been added to water. In this way, the pigment becomes thoroughly distributed throughout the slurry of the components and is integral and homogeneously present throughout the entire composition and hence, throughout the product to which the composition is applied.

The silica sand and the cement are mixed with the desired amount of water to initially form a slurry. In addition, the desired amount of lime or calcium oxide may be included with the initial mixture of sand and cement to form the slurry. Optionally, the calcium oxide may be added to the slurry of the water, cement and sand.

When the pigment is to be added to the composition, it is also included with the initial components and the initial slurry. The amount of the water which is added to these components in the slurry will depend upon the desired viscosity of the slurry which is to be produced. However, as indicated previously, the slurry should have a fairly thick consistency, that is, a fairly high viscosity so that it is flowable but yet will adhere to a surface, such as a vertical surface to which it may be applied. The actual viscosity of the composition can be varied by the end user merely by controlling the amount of water added.

In the slurry as formed, the patching composition includes a cementitious material, such as the Portland cement, in an amount of about 25% to about 65% by weight, based on the total weight of the composition. More preferably, the cement can range from about 30% to about 60% by weight, based on the total weight of the composition.

The silica sand is usually present in an amount of about 15% to an amount of about 65% by weight based on the total weight of the composition. In the case of the silica sand No. 60, the sand is also preferably present in an amount of 30% to about 60% by weight, based on the total weight of the composition. The silica sand No. 30 is preferably present in an amount of about 20% to about 30% by weight based on the total weight of the composition. The calcium oxide is preferably present in an amount of about 6% to about 15% by weight, based on the total weight of the composition. As indicated previously, the major balance of the composition is comprised of water which is preferably present in an amount of about 12 to 24% by weight, based on the total weight of the composition.

As indicated previously, a pigment may be present in an amount of about 0.2% to about 1% by weight. In the more preferred range, the pigment, if any, is present in an amount of about 0.5% to about 0.8% by weight, based on the total weight of the composition. Here again, it is often difficult to accurately estimate the amount of pigment since the color matching is often determined by the color of the existing concrete surface to which the composition is to be applied.

The cementitious composition may be made in a mixer or it can be mixed by hand, depending upon the actual amounts to be prepared. Where any larger quantities are required, a mixer is preferred. Generally, the amount of water added to the composition can vary depending upon the desired consistency of the slurry at the time it is to be applied to the concrete surface.

Where mixing with an apparatus is employed, a plaster mixer is preferred such as for example, an Esseck mixer. Other types of mixers may also be used with the composition of the invention. The plaster mixers have been preferred over the cement type mixers inasmuch as the plaster mixers are not adapted for the mixing of gravel which may be included in a typical concrete composition but which is not included in the putty compositions of the present invention.

Preferably, for an average slurry having a weight of for example, 100 to 200 pounds, mixing may occur for a relatively short period of time since the composition will begin to set-up. As indicate previously, it may be desirable to include reinforcing fiber in the actual patching composition in order to provide additional strength to the resultant putty as applied to the concrete surface. Fiberglass is one of the preferred fibers which may be used. The Fiberglass may be introduced into the composition from spools of the Fiberglass in the form of rovings or strands and chopped into small fibers. Otherwise, the fibers are commercially available. The fibers are chopped into lengths of about ¼ to about ½ inch. Lengths shorter than ¼ inch have not been found to be suitable and lengths greater than ½ inch have all been found to interfere with the application and also do not provide significantly added strength to the final product.

As indicated previously, the preferred fiber is that of Fiberglass. However, it should be understood that other forms of fibers may be included and include for example, lithium, quartz or grown crystals, etc. If desired, small sized, high aspect ratio metal fibers may be interspersed with a non-metallic fiber in the event that it is desired to add some type of metallic body.

The amount of water which is added is usually preferably maintained at the minimum amounts since it is desired to have the composition initially set-up within about 2 to 3 minutes. In the case of deep pockets where the composition is applied in any thick layers, the set-up time may take 20 to 30 minutes. The amount of set-up or curing will range typically from about a few minutes to about a few hours, depending upon the humidity and the ambient temperature conditions. If the ambient temperature is high, the cure time is reduced. However, when the humidity is high, the cure time is increased.

The No. 30 silica sand is employed when there are large voids present in the concrete surface to be patched and also when there are large pockets.

The composition of the present invention is primarily designed to provide a finished surface on concrete structures, or on concrete surfaces. It also is capable of providing a finished surface on concrete in the nature of stucco. In most cases, after the conventional concrete compositions are applied, and usually in three coats, the finish is not necessarily smooth and flat. Rather, the finish is somewhat rough. The composition of the invention is effective in providing a smooth finish, and moreover, it is highly effective in filling voids and cracks.

It is also possible to use two different types of sand sizes in the composition of the invention. As an example, a No. 30 sand is used to provide a smoothness, and a No. 60 sand may be used to fill the voids and holes in a concrete surface. Both sands are used in a combination, as aforesaid. When used as a combination, the cement is used in an amount of about 25% to about 45% by weight. The No. 60 sand would be used in an amount of about 25% to about 45% by weight, and the No. 30 sand would be used in an amount of about 12% to about 25% by weight. The lime would be used in an amount of about 4% to about 15% by weight. Thus, in one such composition, the cement would be present in an amount of about two pounds, the No. 30 sand would be present in an amount of about one pound, and the No. 60 sand would be present in an amount of about two pounds. The lime would be present in an amount of about one-fourth pound.

The composition is applied in a coating thickness of about ¼ inch to about ⅛ inch. The particle size of the sand must also increase as the thickness increases. This is in contrast to a conventional concrete composition, which is normally used in a thickness of about ¾ inch.

The composition of the present invention may be premixed and provided as a mixture in a sealed container. Preferably, and for better results, the ingredients are supplied to the user and the composition typically mixed at a site of use. However, a composition can be packaged in a sealed container, as aforesaid, and supplied to a user, much in the same manner as a spackling composition used for plaster and plasterboard walls.

The composition of the invention is frequently referred to in the art as a "sacking" composition in that it is specifically designed for use in filling voids, such as cracks or small holes. In that sense, the composition is unlike a conventional Portland cement composition. The composition of the invention also has a fairly quick cure time in that the composition will actually cure with a fair structural integrity after about 15 to 25 minutes of set-up. The actual full cure does, however, take about 8 to about 12 hours, although within 25 minutes the patching composition has achieved a true structural integrity. In comparison to a concrete prepared from a conventional Portland cement, that composition usually requires a brown coat, a scratch coat and a final coat and in total, all three coats take, at very least, three days to achieve a reasonably good cure. Thus, the present invention has a much faster cure rate than does any conventional cement composition in the marketplace.

In addition to the foregoing, the composition of the invention is adapted for a single application, that is, it is only necessary for the user to apply one single coat. This is again unlike a conventional concrete composition in that three coats are required and moreover, there is a substantial delay in the successive applications of the second and third of the three coats.

When applying the composition of the present invention, it is preferable to permit the composition to bleed somewhat, that is, to permit a leaching out of alkaline material. This is accomplished by spraying the composition lightly with water and which permits a bleaching of the alkaline materials or so-called "bleeding", as well as reduces the temperature. As a result, there is less likelihood of any cracks or shrinkage during cure.

Testing of the composition of the present invention reveals that the specific gravity of this composition will range between 2.5 and 2.8 and with a specific gravity more specifically and usually within the range of about 2.6 to about 2.75 and preferably 2.7. Fineness, as determined by the air permeability method, is about 2,600, plus or minus 160 cubic centimeters per gram. In comparison, the specific gravity of a normal Portland cement is about 3.15 and the usual fineness range of a conventional Portland cement is about 3,500 to about 4,000 square centimeters per gram.

The composition of the present invention actually functions as a finish for concrete surfaces and is intended as a type of sacking composition to be used on concrete surfaces containing tiny pits and air holes, typically referred to as "bug holes." Consequently, the composition of the present invention is encompassed by that composition defined in American Concrete Industry Standard 116R-90, Cement and Concrete Terminology, as a "Finish for Formed Concrete Surfaces."

EXAMPLES

The invention is further illustrated by but not limited to the following examples.

Example 1

180 pounds of Portland cement No. 2 was mixed in a vat with 180 pounds of silica sand No. 60. 50 pounds of calcium oxide was added to the Portland cement and silica sand mixture. At that point 8 gallons of water was added to the vat.

The entire mixture was introduced into an Esseck finish plaster mixer to form a slurry. The mixer was agitated at a high rate of speed for a few minutes and which produced a thoroughly mixed and homogenous slurry.

The resultant patching composition had a fairly thick viscosity and could be applied to a plaster surface with a trowel. It was found just slight amounts of water added to the compositions substantially reduced the viscosity.

When the composition dried, it had a color very similar to that of the actual concrete surface used to fill holes and voids in that surface. Furthermore, the patching composition when smoothed with a trowel, dried with essentially the same surface texture as the existing concrete surface.

Example 2

180 pounds of Portland cement No. 2 and approximately 90 pound of silica sand No. 30 were added to a vat along with approximately 50 pounds of lime. Thereafter, approximately 5 gallons of water was added to this vat.

The contents of the vat was then introduced into an Esseck finish plaster mixer to form a slurry. The mixer was agitated at a high rate of speed for a relatively short time. A thoroughly mixed and homogeneous slurry was formed in the mixer after the thorough mixing.

Again, the slurry had a viscosity and consistency such that it was able to be applied to holes and voids in a plaster surface and to fill those holes and voids and be retained in the holes and voids. Moreover, when smoothed with a trowel, the patching composition resulted in a surface finish and texture similar to that of the original concrete surface.

Example 3

The process of preparing the composition of Example 2 is re-prepared except that approximately 1 pound of iron oxide pigment is added to the composition in order to provide a slight red color to the final composition. After the iron oxide pigment has been added, the contents of the vat is then introduced into the Esseck finish plaster mixer as previously described and mixed to provide the homogeneous slurry. The remaining portion of the process of preparing this composition is essentially the same.

Example 4

The process of Example 1 is again performed except that in this case a fiberglass fiber is introduced into the vat. In this case, approximately ½ pound of chopped glass fiber is introduced into the vat and thoroughly mixed with the composition. The contents of the vat is then introduced into the Esseck finished plaster mixer and mixed in the same manner as previously described.

Thus, there has been illustrated and described a unique and novel patching composition for concrete surface and a process for producing same and a process of using the same and which simulates the original concrete surface. This composition and the processes therefore fulfill all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and application which do not depart from the spirit and scope of the invention are deemed to be covered by the invention.

Having thus described the invention, what I desire to claim and secure by letters patent is:

1. A light weight patching composition for a single coat application to rough surfaced concrete surfaces having holes and voids with a coating thickness and which patching composition has substantially less weight than a conventional concrete to which the patchy composition is applied and which can also match the surface appearance of the original concrete surface and provide a smooth unmottled surface thereto, said composition comprising:
   a) a cementitious material in an amount of about 25% to about 65% by weight based on the total weight of the composition;
   b) a silica sand having a particle size within the range of No. 30 to No. 60 sieve sizes and which has a size selected so that the patching composition can readily fill a selected void or hole, the silica sand being present in an amount of about 25% by weight to about 65% by weight based on the total weight of the composition;
   c) a calcium oxide mixture containing at least 90% calcium oxide and present in an amount effective to increase the curing rate of the composition and the degree of bonding, said amount of calcium oxide being greater than the amount of calcium oxide found in a cementitious composition formulated with a Portland cement and at least about 4% by weight to about 30% by weight based on the total weight of the composition; and
   d) the patching composition being mixed with water and having a viscosity with a thick consistency sufficient to create a putty to fill in voids or holes in a concrete surface and remain therein during a hardening stage and also provides a smooth surface texture, said composition being formulated so that it can be applied in a single coat application to provide said smooth unmottled surface, with a coating thickness of no less than about ⅛ inch and no greater than about ¼ inch, and which composition has an initial cure time of up to about 30 minutes, said composition also having a surface appearance and texture similar to the concrete surface to which the composition is applied.

2. The patching composition of claim 1 wherein the silica sand is a No. 30 sand and ranges from about 15% by weight to about 35% by weight based on the total weight of the composition.

3. The patching composition of claim 1 wherein the silica sand is a No. 60 sieve size sand and ranges from about 30% by weight to about 65% by weight based on the total weight of the composition.

4. The patching composition of claim 1 wherein the Portland cement is present in an amount of about 30% by weight to about 60% by weight based on the total weight of the composition.

5. The patching composition of claim 1 wherein the silica sand is a No. 60 sieve size sand and ranges from about 15% to about 32% by weight based on the total weight of the composition.

6. The patching composition of claim 1 wherein the silica sand is a No. 30 sieve size sand and ranges from about 25% to about 65% by weight based on the total weight of the composition.

7. The patching composition of claim 1 further comprising water present in the composition in an amount of about 9% to about 30% by weight based on the total weight of the composition.

8. The patching composition of claim 7 further comprising a pigment present in the composition in an amount of about 0.2% to about 1.0% by weight based on the total weight of the composition.

9. The patching composition of claim 1 further comprising chopped fibers thoroughly mixed throughout the composition.

10. The patching composition of claim 1 wherein the composition has a complete cure in about eight to twelve hours.

11. A patching composition for a single coat application to rough surfaced concrete surfaces having holes and voids with a selected coating thickness and which patching composition has substantially less weight than conventional concrete to which the patching composition is applied and which can also match the surface appearance of the original concrete surface and provide a smooth unmottled surface thereto, said composition comprising:
   a) a cementitious material in an amount of about 25% to about 65% by weight based on the total weight of the composition;
   b) a first silica sand having roughly about a No. 30 sieve size and which has a sieve size selected so that the patching composition can readily fill selected voids and holes, the silica sand being present in an amount of about 12% to about 25% by weight based on the total weight of the composition;
   c) a second silica sand having a particle size of roughly about No. sieve size 60 and which is present in an amount of about 25% to about 45% by weight based on the weight of the composition;
   d) a calcium oxide mixture containing at least 90% calcium oxide and present in an amount effective to increase the curing rate of the composition and the degree of bonding, said amount of calcium oxide being greater than the amount of calcium oxide found in a cementitious composition formulated with a Portland cement and at least about 4% by weight to about 30% by weight based on the total weight of the composition; and
   e) the patching composition being mixed with water and having a viscosity with a thick consistency sufficient to create a putty to fill in voids or holes in a concrete surface and remain therein during a hardening stage and also provides a smooth surface texture, said composition being formulated so that it can be applied in a single coating application to provide said smooth unmottled surface, with a coating thickness of no less than about ⅛ inch and no greater than about ¼ inch, and which composition has an initial cure time of up to about 30 minutes, said composition also having a surface appearance and texture similar to the concrete surface to which the composition is applied.

12. The patching composition of claim 11 wherein the Portland cement is present in an amount of about 30% by weight to about 60% by weight based on the total weight of the composition.

13. The patching composition of claim 11 further comprising water present in the composition in an amount of about 9% to about 30% by weight based on the total weight of the composition.

14. The patching composition of claim 13 further comprising a pigment present in the composition in an amount of about 0.2% to about 1.0% by weight based on the total weight of the composition.

15. A method for patching holes and voids in rough surface textured concrete surfaces in a single coat composition and which is made from a concrete composition comprising a Portland cement by using and applying in a single coating an improved light weight patching composition which also matches the surface appearance of the original concrete surface, said method comprising applying to the voids and holes a patching composition comprised of:

a) a cementitious material in an amount of about 25% to about 65% by weight based on the total weight of the composition;

b) a silica sand having a particle sieve size which is selected so that the patching composition will readily fill a selected void or hole, the silica sand being present in an amount of about 15% by weight to about 65% by weight based on the total weight of the composition;

c) a calcium oxide mixture containing at least 90% calcium oxide and having a high calcium content present in an amount which is substantially greater than the amount of calcium oxide found in the concrete to which the patching composition is applied and which calcium oxide is present in an amount of at least about 4% by weight to about 30% by weight based on the total weight of the patching composition; and d) the patching composition being mixed with water and having a viscosity with a thick consistency sufficient to create a putty to fill in voids or holes in a concrete surface and remain therein during a hardening stage and also provide a smooth surface texture, said composition being formulated so that it can be applied in a single coating application to provide a smooth unmottled surface, with a coating thickness of no less than about 1/8 inch and no more than about 1/4 inch, and which composition has an initial cure time of up to about 30 minutes, said composition also having a surface appearance and texture similar to the concrete surface to which the composition is applied.

16. The method of claim 15 wherein the silica sand of said composition is a No. 30 sieve size sand and ranges from about 15% by weight to about 35% by weight based on the total weight of the composition.

17. The method of claim 15 wherein the silica sand of said composition is a No. 60 sieve size sand and ranges from about 30% by weight to about 65% by weight based on the total weight of the composition.

18. The method of claim 15 further comprising water present in the composition in an amount of about 9% to about 30% by weight based on the total weight of the composition.

19. The method of claim 18 further comprising a pigment present in the composition in an amount of about 0.2% to about 1.0% by weight based on the total weight of the composition.

* * * * *